INVENTOR.
Sidney L. Lunden

United States Patent Office 3,531,001
Patented Sept. 29, 1970

3,531,001
LUMBER SORTING AND STACKING APPARATUS
Sidney L. Lunden, Spokane, Wash., assignor to Moore-Iem, Inc., Spokane, Wash., a corporation of Washington
Filed Nov. 12, 1968, Ser. No. 774,827
Int. Cl. B65g 57/10
U.S. Cl. 214—6    7 Claims

ABSTRACT OF THE DISCLOSURE

A sorting and stacking apparatus is disclosed having an elongated sorting device for sorting various size boards into a plurality of bins. A movable stacking device is mounted on tracks that run along side the bins for removing the boards from the bins, forming layers of boards and stacking the boards opposite the bins in orderly stacks. The movable stacking device has an extendable conveyor means for removing the boards from the bins and moving the boards onto the movable stacker. A forked layer support means moves forward to move a layer in front of stripping means and then lowers the layer onto the stack. The movable stacking device has a sensing device to determine when the layer is approaching the top of the stack to operate a drive means to pull the forked lumber support means back between the stripping means to deposit the layer on the stack. A further drive means drives the movable stacking device to bins selected by an operator.

BACKGROUND OF THE INVENTION

This invention relates to lumber handling equipment and more particularly to sorting and stacking apparatus for sorting and stacking various size lumber.

Generally the output of a saw mill includes lumber of various lengths and widths that must be sorted and stacked according to size and into neat stacks before transferring to a dry kiln or other processing.

Although there is equipment presently available for automatically sorting and stacking lumber of various widths and lengths, this equipment is very expensive, requiring an exceedingly large production to justify such expenditures. Furthermore, it has been found that such equipment is complicated requiring considerable maintenance.

A further problem generally associated with present automatic sorting and stacking devices is the requirement that either a separate stacker device be associated with each stacking station or that a full stack load of boards must be accumulated at a stacking station before a stacking device may be utilized.

One of the principal objects of this invention is to provide a combination sorting and stacking device that is relatively inexpensive to manufacture, simple to operate and requires a minimum of maintenance.

An additional object of this invention is to provide a combination sorting and stacking apparatus having a plurality of stacking stations serviced by a single stacking device that is capable of forming a full stack or just adding one or more layers to an existing stack without any additional manipulation or control.

A further object of this invention is to provide a combination sorting and stacking apparatus that may be operated by as few as one person.

An additional object of this invention is to provide a sorting and stacking apparatus that has a small power requirement.

A still further object of this invention is to provide a combination sorting and stacking apparatus that greatly reduces the cost of sorting and stacking lumber.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
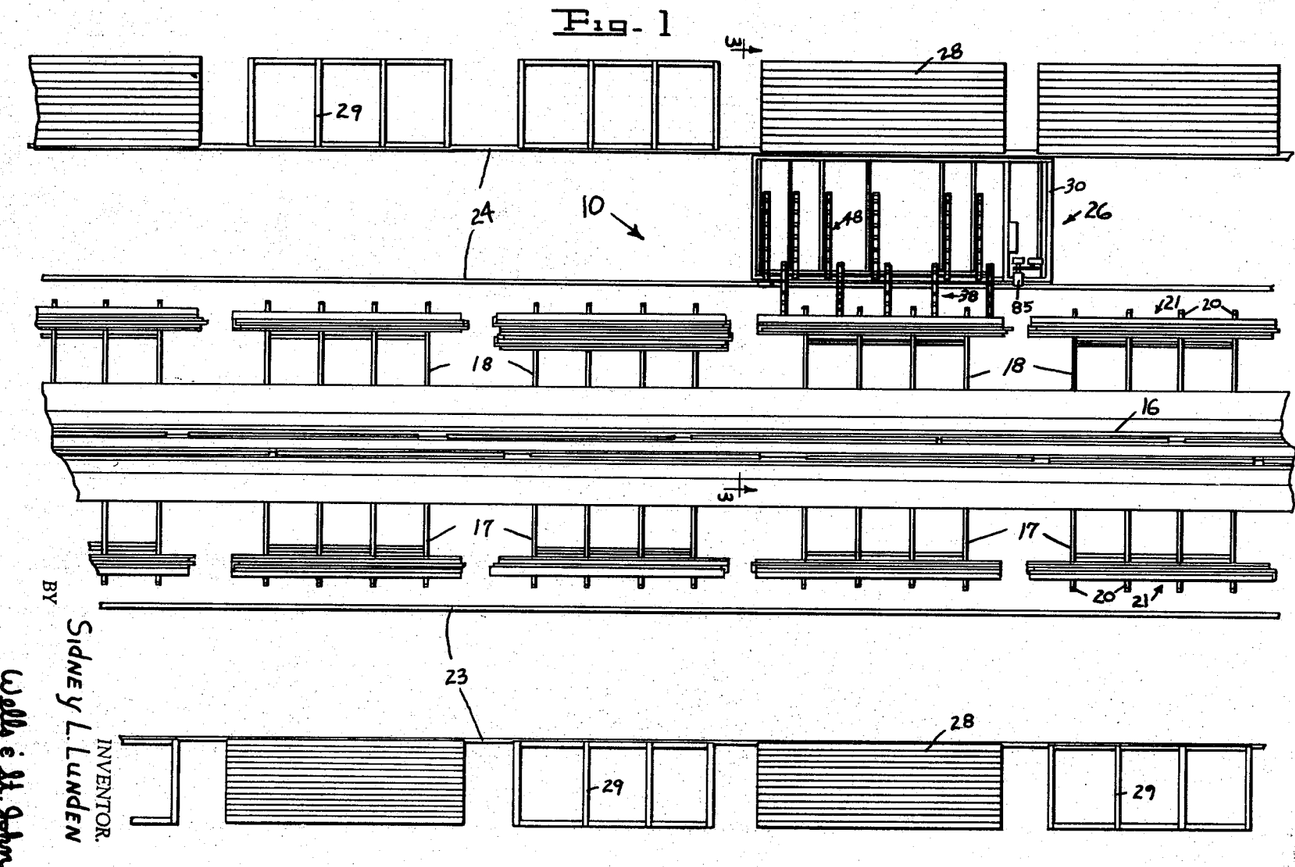
FIG. 1 is a schematic view of a portion of a sorting and stacking apparatus embodying the principles of this invention for sorting and stacking a large number of boards of various widths and lengths, in which the boards are initially sorted into a plurality of individual bins and then removed from the bins by a movable stacking device servicing the bins and stacking the lumber into stacks opposing the bins.

Referring now in detail to the drawings, there is shown in FIG. 1 a sorting and stacking apparatus 10 for receiving a plurality of different sized boards in an elongated sorting device 16 that automatically sorts the boards into a plurality of bins 17 and 18 positioned along the sides of the sorting device 16.

Figure 3:
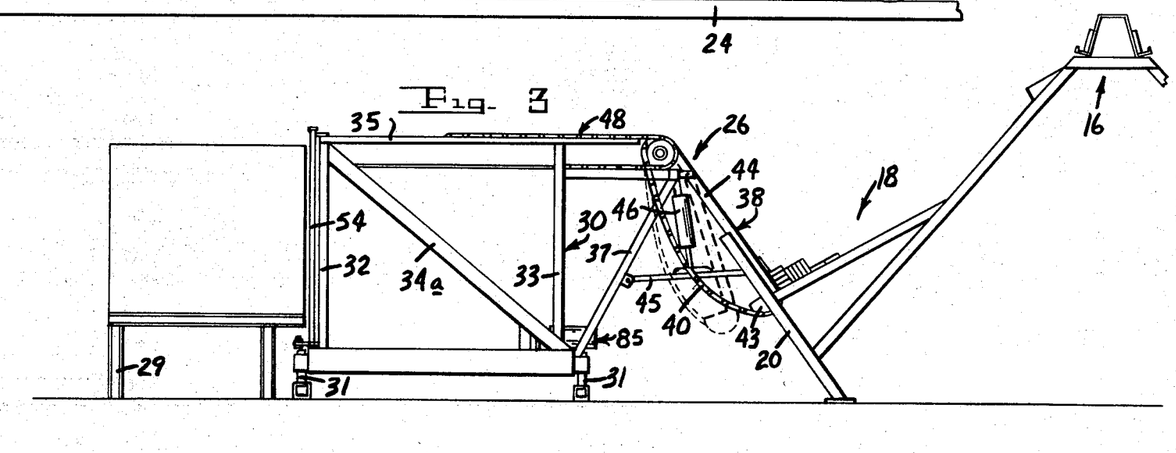
FIG. 3 is a cross sectional view taken along line 3—3 in FIG. 1 showing the side of the movable stacking device positioned alongside a selected bin for removing the lumber from the bin and stacking the lumber opposite the bin in a uniform stack.

The sorting device 16 is commonly referred to as an edge sorting device that may contain as many sorting stations as required. The boards move down the elongated sorting device 16 and are ejected therefrom as shown in FIG. 3 into bins that receive boards of a specific size. Each of the bins 17 and 18 have strut members 20 (FIG. 3) with openings 21 therebetween for permitting access into the front of the bins.

Rail sections 23 and 24 are mounted alongside the bins 17 and 18 respectively for supporting a movable stacking device 26. For a particular design, the movable stacking device 26 moves along rail section 23 to the end of the elongated sorting section and around the sorting section to the rail section 24 for servicing both bins 17 and 18. If the sorting and stacking apparatus has a large number of bins it may be desirable to have one stacking device on each side of the sorting device 16.

The boards in the bins are removed from the bins onto the movable stacking device and then stacked in specific locations or stacking stations that are opposite the bins 17 and 18 to form orderly stacks of lumber 28. The lumber is stacked on stack supports 29 that are located at each stacking station.

Figure 2:
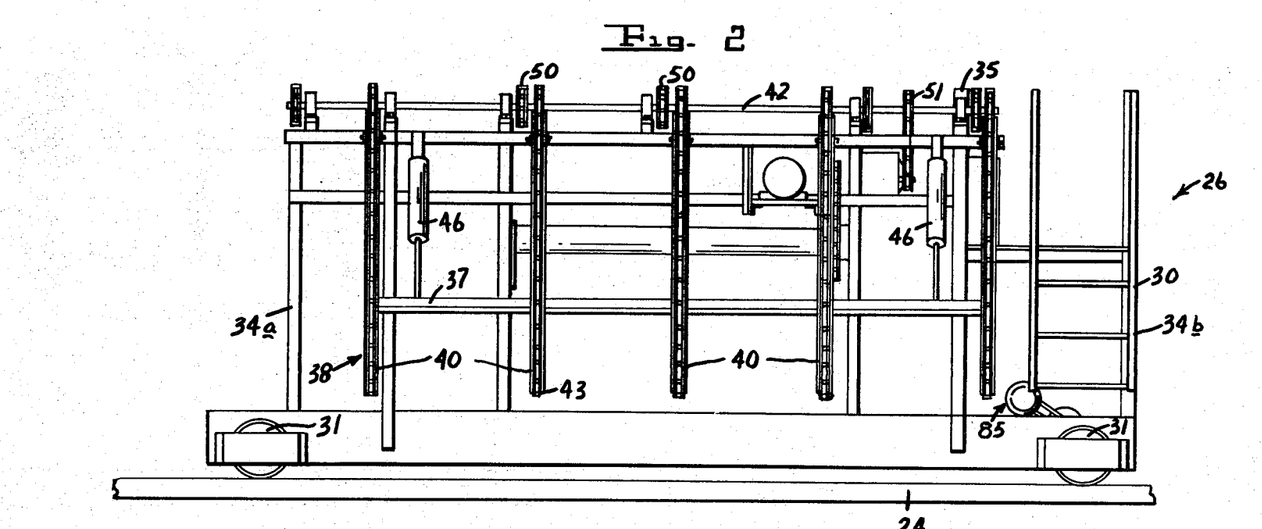
FIG. 2 is a rear view of the movable stacking device.

The movable stacking device 26 has a rectangular box-shaped frame 30 with rail wheels 31 (FIGS. 2 and 3) rotatably mounted on the frame adjacent the lower corners movably supporting the device 26 on the rail sections 23 and 24.

For purposes of orientation the side of the frame facing the lumber stack will be called the front 32 and the side facing the bins will be termed the back 33 and the sides facing down the rail sections will be called ends 34a and 34b respectively. The frame 30 has an upper surface 35 on which the layers of boards are supported after they are removed from the bins to define a layer of boards preliminarily to positioning the layer on the stack.

The movable stacking device 26 has a back extension frame 37 that includes an inclined conveying means 38 that is extendable outward from the backside of the movable stacking device into the openings 21 of the bins for removing boards from the bins and moving the boards onto the body of the movable stacking device. The back extension frame 37 includes a pivot frame 44 that swings outwardly into the openings 21 of the bins.

The conveying means 38 includes a plurality of spaced lug chains 40 that are mounted on the pivot frame 44. Each of the lug chains 40 is mounted between a drive sprocket 41 and lower idler shoe 43. The drive sprockets 41 are mounted on a drive shaft 42 that extends across the back of the movable stacking device.

A foldable toggle arm 45 interconnects the pivot frame 44 with the back of the frame 30 for pivoting the lug chains outwardly to remove the boards from the bin. Actuators 46 are operatively connected to the foldable toggle arms 45 to swing the pivot frame outwardly or inwardly.

Figure 4:
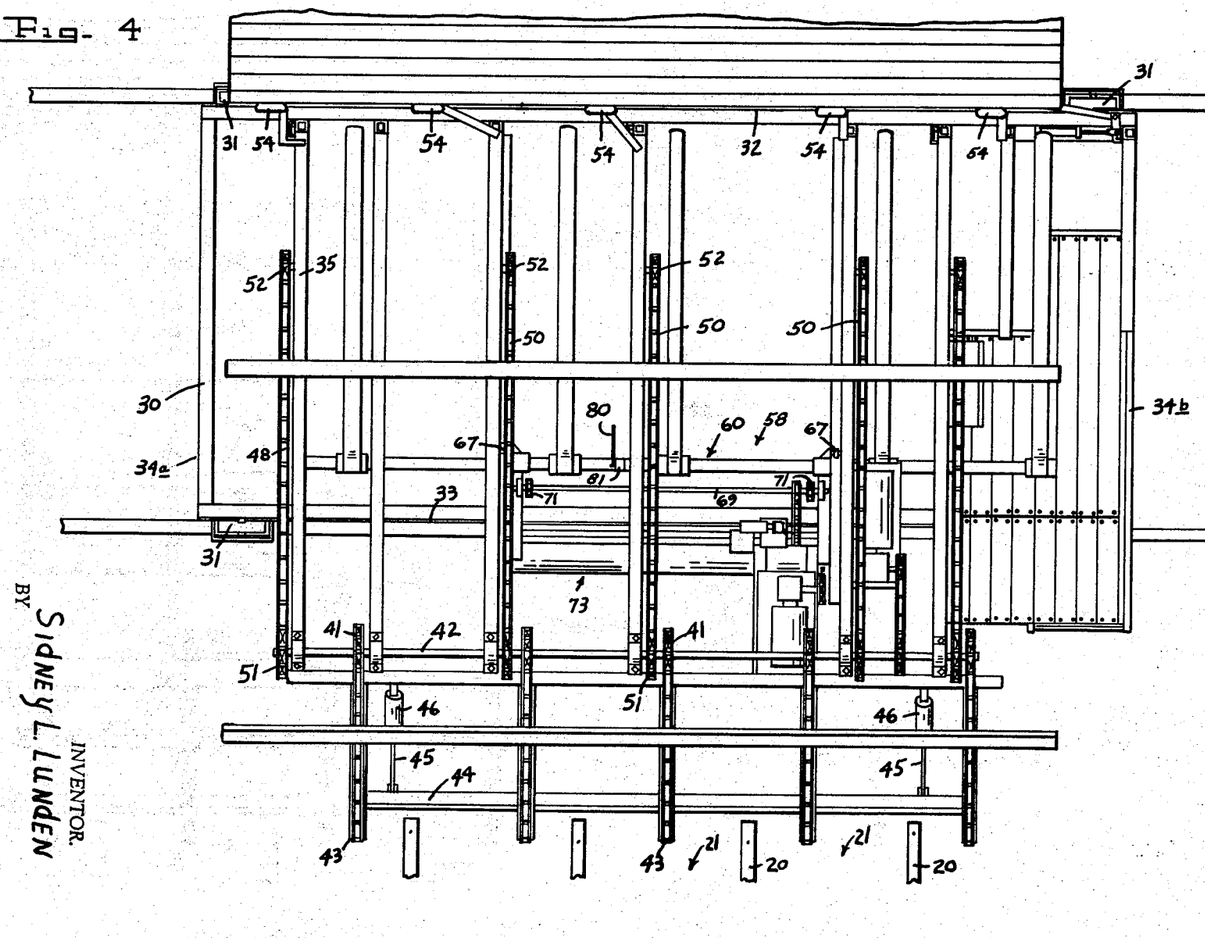
FIG. 4 is a detail plan view of the movable stacking device illustrated in FIG. 3.

A horizontal conveying means 48 is mounted on the movable stacking device for moving the boards from the conveying means 38 forward along the top surface 35 towards the front 32 to form a layer of boards to be stacked. The conveying means 48 includes a plurality of parallel chains 50 that are supported between drive sprockets 51 mounted on the drive shaft 42 and idler sprockets 52 (FIG. 4) that are positioned toward the front of the frame.

Figure 8:
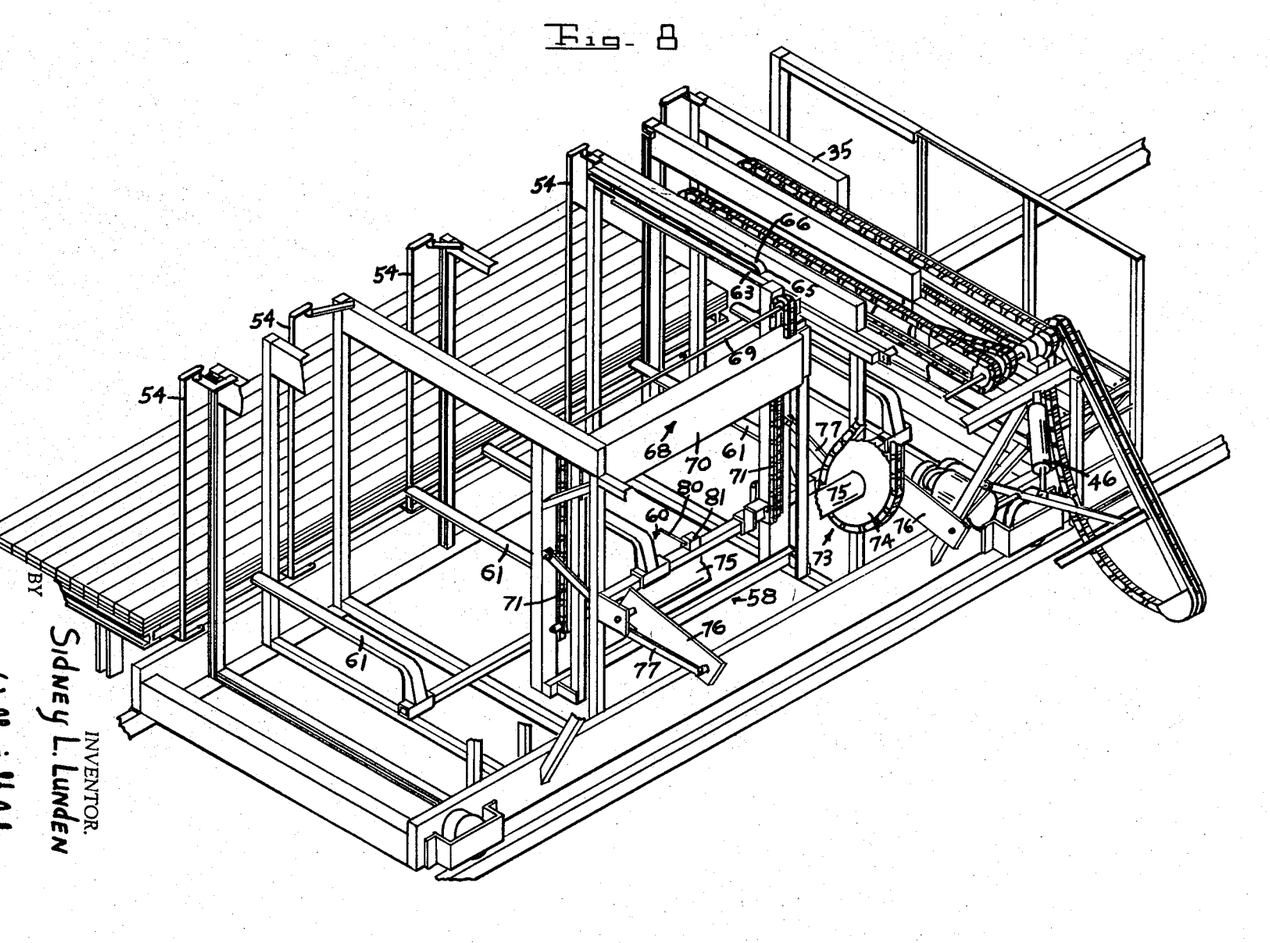
Figure 9:
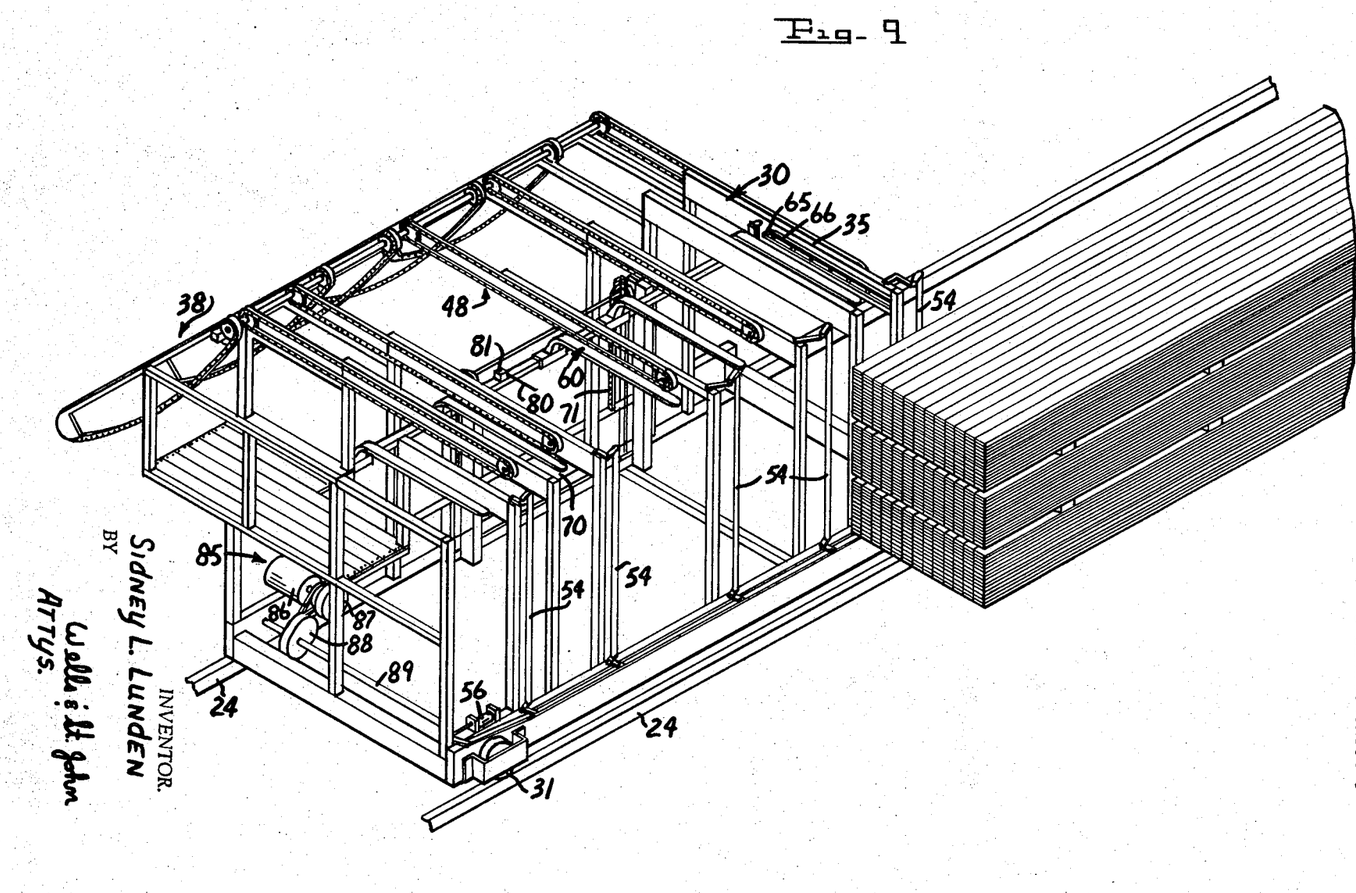
FIG. 9 is a perspective view of the movable stacking device in relationship to a formed stack showing the stacking device moving away from the formed stack.

Vertical stripping members 54 (FIGS. 3–9) are positioned along the front of the frame 30 for movement between an extended position slightly forward of the frame front 32 and a retracted position into the frame. As shown in FIG. 9, an actuator 56 is operatively connected to the stripping members 54 for moving the stripping members from the extended position to the retracted position.

A reciprocable carriage 58 (FIGS. 4–8) is mounted on the frame 30 for forward and back movement. A forked layer support means 60 is mounted on the carriage for up and down movement relative to the carriage and forward and back movement with the carriage for supporting a layer of boards on the carriage. The forked layer support means has fork-lift type arms 61 that extend forward for lifting the layer of boards from the top surface 35 and depositing the layer on the stack. The carriage 58 is reciprocably mounted on the frame by rollers 64 that ride in horizontal tracks 63.

Elongated forward extending cam surfaces 65 (FIGS. 5–8) are mounted on the frame 30 immediately above the tracks 63 for receiving a cam follower 67 (FIG. 5) extending from the layer support means 60 as the carriage moves forward. Cam surfaces 65 have an inclined initial section 66 to raise the arms 61 as the carriage starts forward to lift a layer of boards from the surface 35 and carry the layer forward.

The forked lumber support means 60 has a counterweight 68 system connected thereto for permitting the lowering of a loaded support means 60 when the support means is in front of the stripping element 54 and for raising the support means 60 when the layer is removed. The counterweight system 68 includes a shaft 69 rotatably mounted on the carriage 58. Chains 71 extend over sprockets mounted on the shaft 69 with one end of the chains connected to the forked lumber support means 60 and the other end connected to a weight 70. The weight 70 is slightly heavier than the weight of the forked lumber support means so that when a layer of boards is removed from the forked lumber support means the weight 70 will raise the forked lumber support means to the up position in preparation for receiving a subsequent layer of boards.

Figure 6:
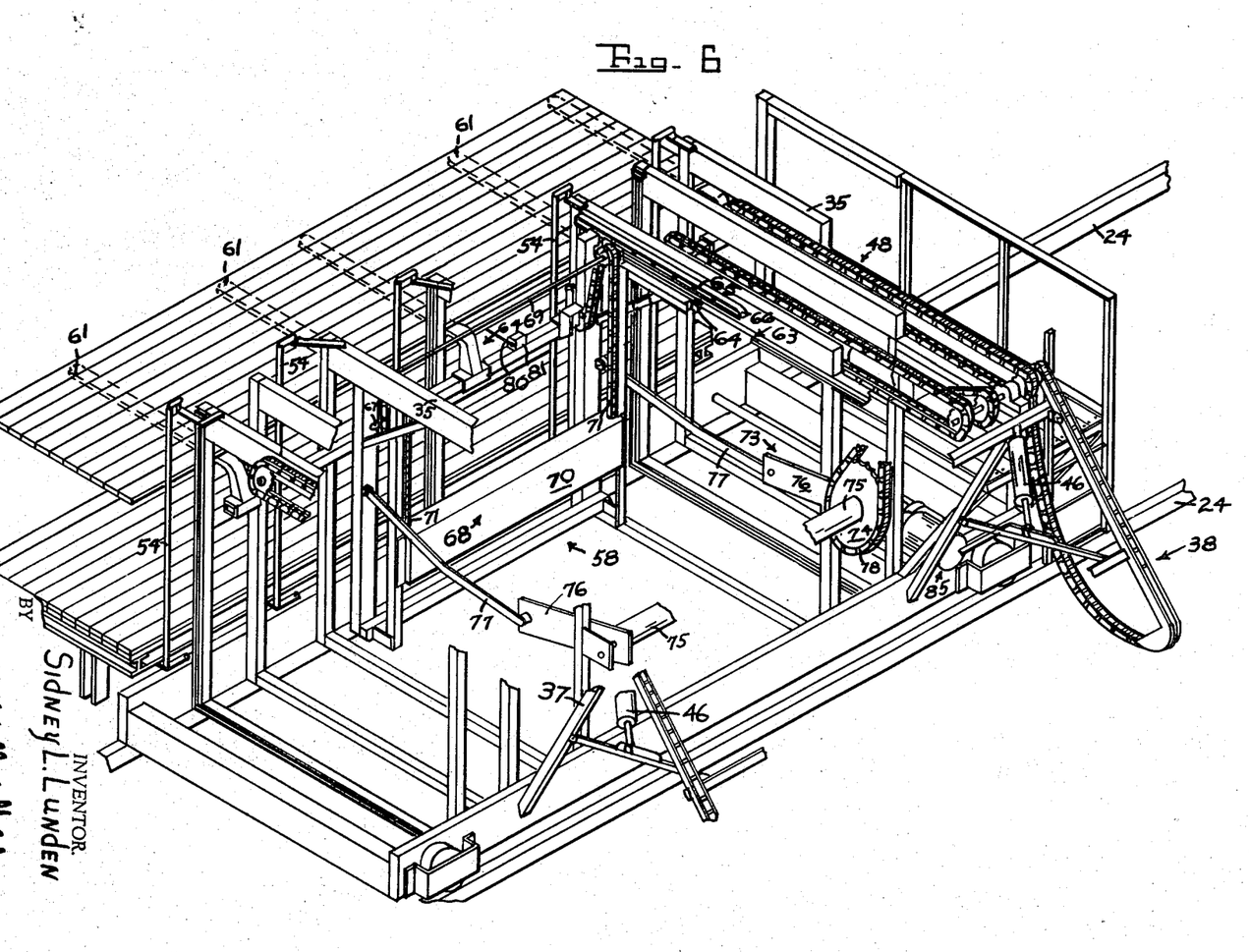
Figure 7:
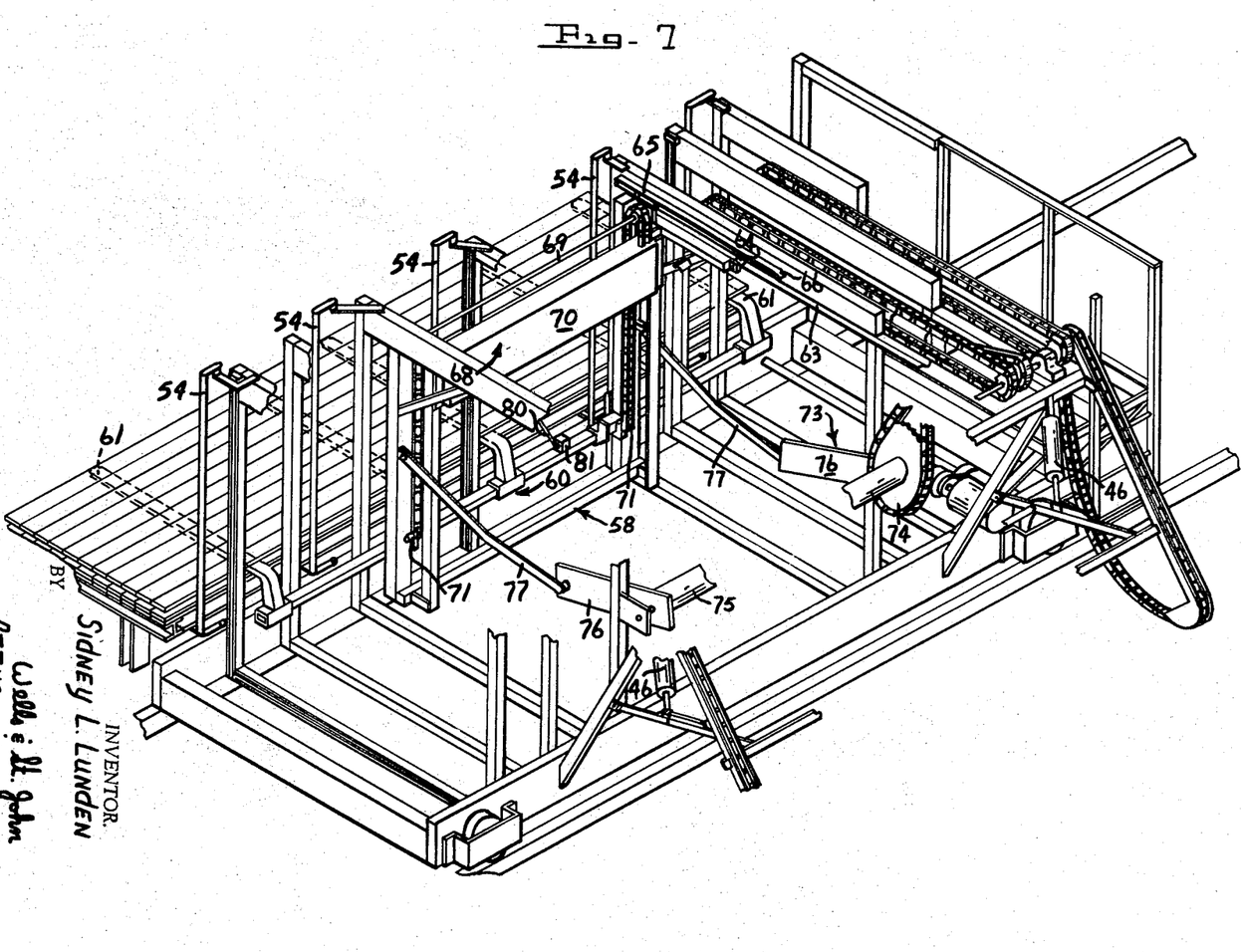

The carriage 58 is reciprocated back and forth through a carriage drive 73 (FIGS. 6–8) that includes a sprocket 74 that is affixed on a rotatable shaft 75. Extensions 76 extend radially out from the shaft 75. Crank arms 77 extend between the ends of the extensions 76 and the rear of the carriage 58 to move the carriage back and forth as the shaft 75 is rotated in opposite directions (FIGS. 6–8). A chain 78 extends between the sprocket 74 and a conventional reversible motor (not shown).

The movable stacking device includes a sensing system mounted on the forked lumber support means for determining the height of the stack to activate the carriage drive 73 to move the forked lumber support means back between the stripping elements 54 immediately above the stack to carefully deposit the layer on the stack. The sensing system includes a feeler arm 80 mounted on the forked lumber support means and extending downward below the forked arms 61 to engage the top of the stack when the layer is immediately above the stack. The feeler arm actuates a switch 81 that controls the carriage drive motor. With this important feature the stacking device may form an entirely new stack or may add one or two or more layers onto an existing stack without having to change or reset the controls. This enables the stacking device to operate independently of the height of the stack. Thus the stacking device can easily finish partly formed stacks or add one or more layers to a stack and move on to a new stacking station.

The movable stacking device 26 includes a drive 85 that moves the movable stacking device along the rail sections. The drive 85 (FIG. 9) includes an electrical motor 86, a hydraulic coupling 87 and a gear reducer 88. The gear reducer 88 is on an axle 89 that rotates the wheels 31. The electric motor 86 is a reversible motor controlled by an operator to move the movable stacking device in either direction on the rails with considerable precision.

Figure 5:
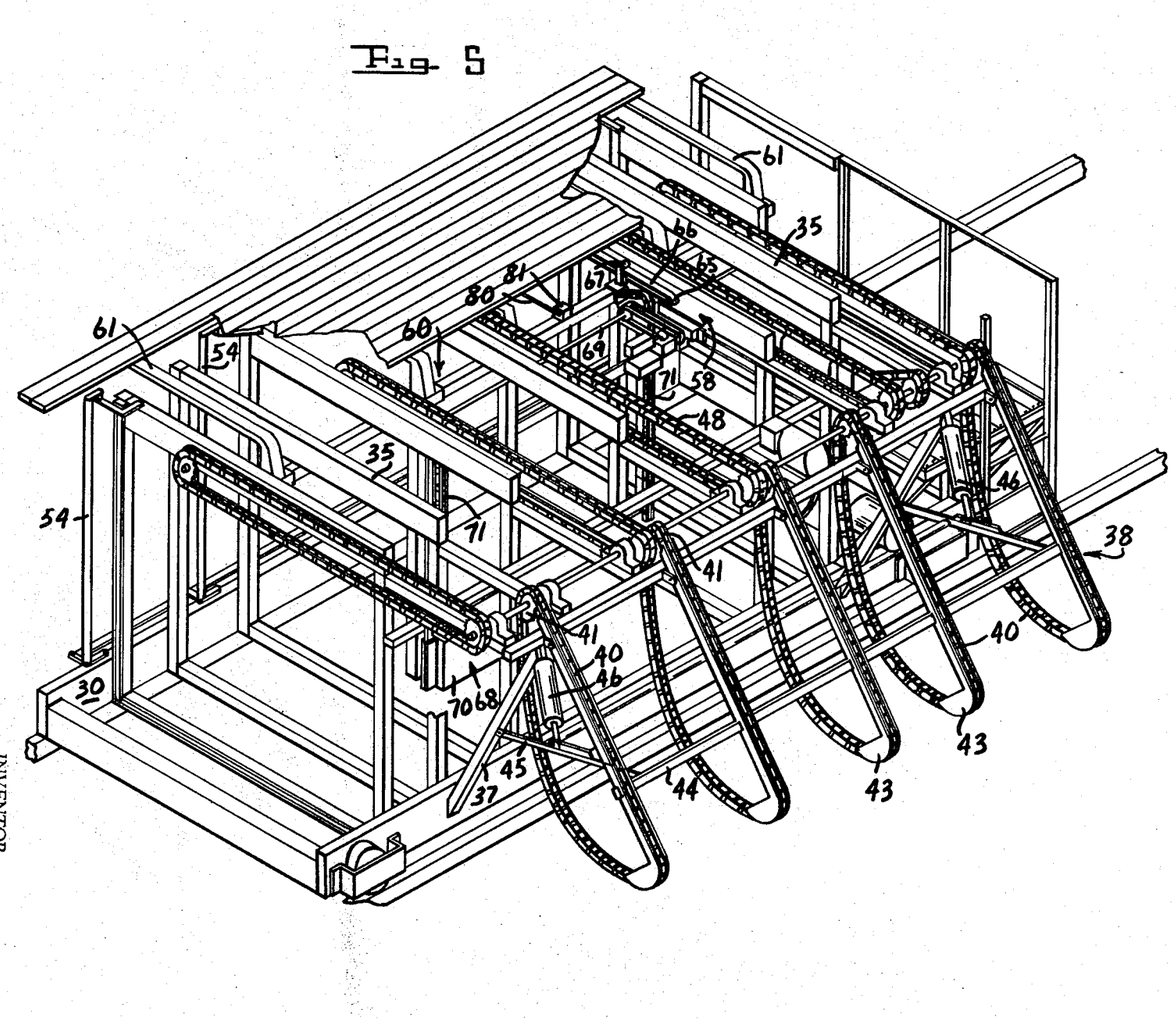
FIGS. 5, 6, 7 and 8 are sequence perspective views of a movable stacking device for removing boards from a selected bin, forming layers of the boards and stacking the layers opposite the bin in a uniform manner.

Reference is made to FIGS. 5–9 in describing the operation of the movable stacking device. Initially the movable stacking device is moved into position alongside the selected bin. The actuator 46 is operated to pivot the conveying means 38 outwardly into the selected bin to remove the boards from the bin and move the boards one at a time onto the upper surface 35. The vertical stripping members 34 are moved to the extended position to define a side of a stack to be formed. As shown in FIG. 5, the boards move forward on the surface 35 by the conveying means 48. The carriage drive 73 is then operated to move the carriage forward. As the carriage moves forward the cam roller 67 engages the inclined section 66 of the cam surface 65 to move the forked lumber support means slightly upward into engagement with a layer of boards to start the boards moving forward. The cam follower 67 continues on the surface 65 until the layer is in front of the stripping members 54. When the cam follower 67 leaves the cam surface 65, the lumber support means starts down in front of the stripping members 54. As the forked arms 61 approach the top of the stack, the feeder arm 80 senses the height of the stack and activates the carriage drive 73 to pull the crank arm 77 backward to move the forked lumber support means 60 rearwardly between the vertical stripping members 54 to strip the layer of boards from the forked lumber means 60 as shown in FIG. 8. After the layer of boards is removed from the forked lumber support means 60 the counterweight system 68 causes the forked lumber support means to move upwardly in preparation for a new cycle.

The sequence is continued until all of the boards in the bin are removed or until the sequence is stopped by the operator. When the operator moves the stacking device to a new stacking position he activates the actuator 46 to retract the conveyor means 38 and operates the actuator 56 to pivot the vertical stripping members 54 away from the formed stack. At this point the operator activates electrical motor 86 to move the movable stacking device 26 along the track to a new position as shown in FIG. 9.

Figure 11:
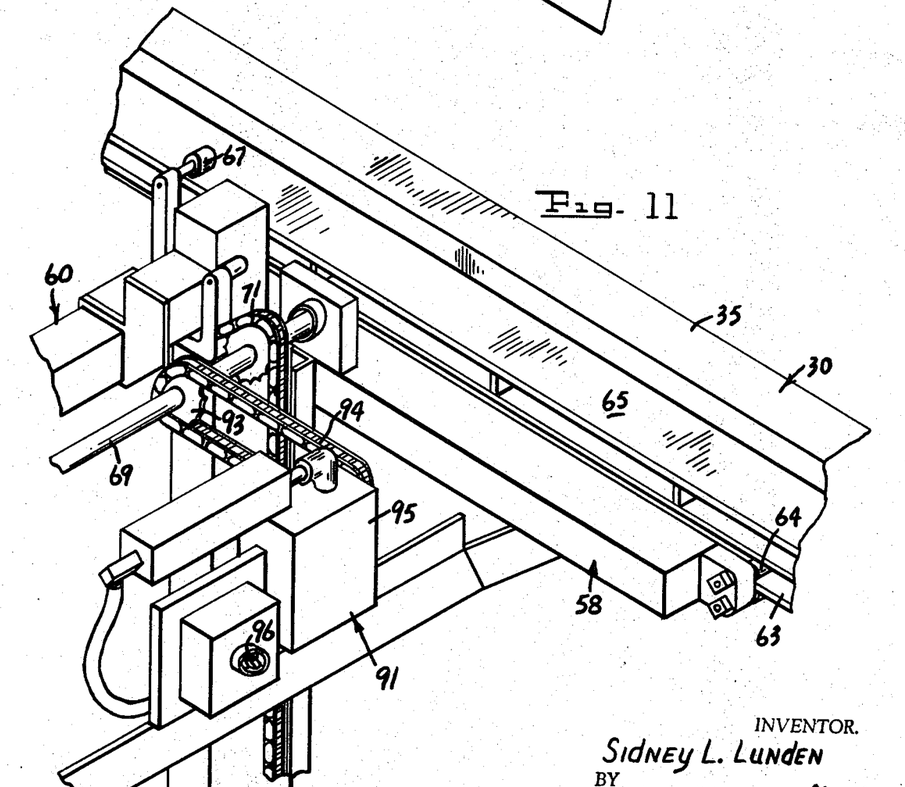
FIG. 11 is an enlarged perspective detailed view of regulating means for controlling the speed at which the lumber is stacked.

It may be desirable to have a speed regulating device 91 included in the counterweight system to control the rate of descent of the forked lumber support means carrying a layer of boards. As shown in detail in FIG. 11, the speed regulating device 91 includes a sprocket 93 that is mounted on the counterweight shaft 69. A chain 94 interconnects the sprocket 93 with a hydraulic flow control valve 95. The rate of flow of hydraulic fluid through the control valve 95 is adjusted by a turn lever 96.

Figure 10:
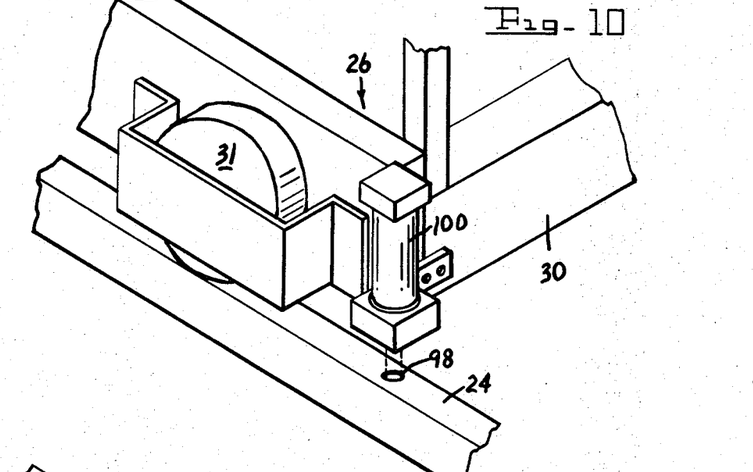
FIG. 10 is a fragmentary enlarged perspective detail view of a means for accurately locating the movable stacking device in relationship to the bin.

It may also be desirable to incorporate a locking device on the movable stacking device to accurately position the movable stacking device in relationship to the bins. This may be accomplished by forming an aperture 98 in the rail corresponding to a bin position as shown in FIG. 10. A hydraulic jack 100 is mounted on the frame 30 adjacent one corner thereof so that when the rod of the hydraulic jack 100 is extended it will extend into an aperture 98 and accurately lock the movable stacking device 26 in position adjacent the corresponding bin. After the desired number of boards are removed from the bin and stacked on the associated stack, the hydraulic jack is actuated to remove the piston rod to enable the movable stacking device 26 to be moved along the rail sections.

It should be understood that the above described embodiment is simply illustrative of the principles of this invention and numerous modifications may be made without deviating from the scope thereof. Therefore, only the following claims are intended to define this invention.

I claim:

1. A lumber sorting and stacking apparatus having:
   a sorting device for sorting lumber into a plurality of spaced lumber storage bins each having side openings and tracks extending alongside the bins, in combination with the improvement of;
   a stacking means that is moveably mounted on the tracks for movement between the bins for removing boards from a selected bin, forming one or more layers of boards, and sequentially positioning the layers of boards adjacent the stacking means opposite the selected bin to form a lumber stack or to add one or more layers of boards to an existing lumber stack independently of the height of the stack,
   said stacking means having a conveyor which includes parallel continuous conveyor chains mounted for pivotal movement from a downward orientation spaced from the bins upwardly and outwardly to an extended position into the side opening of a selected bin to remove boards from the selected bin and sequentially move the boards onto the stacking device, and
   said stacking means further having a drive means for moving the stacking means from one bin to another.

2. A lumber sorting and stacking apparatus having:
   a sorting device for sorting the lumber into a plurality of spaced lumber storage bins, and tracks extending alongside the bin, in combination with the improvement of;
   a stacking means that is moveably mounted on the tracks for movement between the bins for removing boards from a selected bin, forming one or more layers of boards, and sequentially positioning the layers of boards adjacent the stacking means opposite the selected bin to form lumber stacks or to add one or more layers of boards to existing lumber stacks independently of the height of the stacks,
   said stacking means having a drive means for moving the stacking means along the tracks from one bin to another, the stacking means including;
   conveyor means for removing the boards from a selected bin and sequentially moving the boards onto the stacking means to form a layer of boards,
   upright stripping means for defining the side of a lumber stack,
   layer support means moveably mounted on the stacking means for movement between the upright stripping members for receiving a layer of boards and for moving the layer of boards forward beyond the upright stripping members, for lowering the layer of boards alongside the upright stripping members, and for moving the layer against the stripping members to strip the layer from the layer support means,
   a second drive means operatively connected to the layer support means for moving the layer support means between the upright stripping members,
   stack height sensing means for sensing when the lowered layer is in close proximity to the top of the stack for activating the second drive means to move the layer support means back between the upright stripping members to strip the layer of boards from the layer support means and onto the stack independently of the height of the stack, and
   counterweight means operatively connected to the layer support means for permitting the lowering of a layer of boards alongside the upright stripping means and for raising the layer support means when the layer of boards is stripped from the layer support means.

3. The lumber sorting and stacking apparatus as defined in claim 2 wherein a speed control device is operatively connected to the counterweight means for regulating the speed of the upward movement of the layer support means.

4. A lumber sorting and stacking apparatus having:
   a sorting device for sorting the lumber into a plurality of spaced lumber storage bins, and tracks extending alongside the bins, in combination with the improvement of;
   a stacking means that is moveably mounted on the tracks for movement between the bins for removing boards from a selected bin, forming one or more layers of boards, and sequentially positioning the layers of boards adjacent the stacking means opposite the selected bin to form lumber stacks or to add one or more layers of boards to existing lumber stacks independently of the height of the stacks,
   said stacking means having a drive means for moving the stacking means along the tracks from one bin to another, the stacking means including;
   conveyor means for removing the boards from a selected bin and sequentially moving the boards onto the stacking means to form a layer of boards,
   upright stripping means for defining the side of a lumber stack,
   layer support means moveably mounted on the stacking means for movement between the upright stripping members for receiving a layer of boards and for moving the layer of boards forward beyond the upright stripping members, for lowering the layer of boards alongside the upright stripping members, and for moving the layer against the stripping members to strip the layer from the layer support means,
   a second drive means operatively connected to the layer support means for moving the layer support means between the upright stripping members, slack height sensing means for sensing when the lowered layer is in close proximity to the top of the stack for activating the second drive means to move the layer support means back between the upright stripping members to strip the layer of boards from the layer support means and onto the stack independently of the height of the stack, the upright stripping members being moveably mounted on the stacking means for movement between an extended position for defining the sides of the stack and a retracted position spaced from the stack, and actuator means operatively connected to the upright stripping members for moving the upright stripping members from the extended position to the retracted position for disengaging the upright stripping members from a formed stack to thereby permit the stacking means to be moved along the tracks without engaging the side of the stack.

5. A lumber sorting and stacking apparatus comprising:

an elongated track;

storage bins spaced at intervals along one side of the track for supporting lumber substantially parallel with the track;

stack locations spaced at intervals along the other side of the track opposing corresponding storage bins;

a sorting device adjacent the storage bins for sorting lumber and discharging the lumber into the bins according to size;

a frame moveably mounted on the track;

a frame drive means associated with the frame for moving the frame along the track to position the frame between a selected storage bin and the corresponding stacking location;

a layer support surface moveably mounted on the frame for receiving a layer of boards;

moveable conveyor means for removing the lumber from the selected bins and conveying the individual boards successively onto said layer support surface of the frame to form one or more layers thereon, said conveyor means being movable for selectively permitting the frame to be shifted along said tracks without interference with the storage bins;

upright stripping means adjacent the corresponding stack location defining a side of a stack to be formed at said location;

support surface drive means operatively connected to the layer support surface for moving the layer support surface for sequentially positioning a stack location, lowering the layer support surface and then moving the layer support surface between the upright stripping members to strip the layer from the support surface; and a stack height sensing means operatively connected to the support surface drive means and responsive to the height of the stack at the corresponding stack location to activate the support surface drive means to strip the layer from the support surface with the layer support surface located immediately above the stack regardless of the height of the stack, to thereby add to an existing stack or forming a completed stack at the selected stack location.

6. A lumber sorting and stacking apparatus having a sorting device for sorting the lumber and discharging the lumber according to size into a plurality of lumber storage bins that are spaced alongside a track, in combination with the improvement of;

a stacking means for removing the boards from the bins and stacking the boards in stacks on the other side of the track opposing the bins, said stacking means comprising;

a movable frame mounted on the track for movement therealong;

frame drive means operatively connected to the frame for moving the frame along the track to a selected bin;

a layer support means moveably mounted on the frame for movement between the upright stripping members for receiving a layer of boards from the conveying means and moving the layer of boards beyond the upright stripping members above a desired stack location, lowering the layer of boards alongside the upright stripping members and moving the layer against the stripping members to strip the layer from the layer support means to thereby form a stack at said location;

a conveyor means mounted on the frame for removing boards from the selected bin and sequentially moving the boards onto the said layer support means of the frame to form a layer of boards, said conveyor means being moveable for selectively permitting the frame to be shifted along said tracks without interference with the storage bins;

upright stripping means mounted on the frame for defining the side of a lumber stack;

a drive means operatively connected to the layer support means for moving the layer support means between the upright stripping members; and stack height sensing means for sensing the height of an existing stack at the stack location for activating the layer support drive means to move the layer against the stripping members and strip the layer from the layer support immediately above the stack location regardless of the height of the stack to thereby form a new stack or add one or more layers to an existing stack.

7. The lumber sorting and stacking apparatus as defined in claim 6 wherein the stacking means further includes a counterweight means operatively connected to the layer support means for permitting the lowering of a layer of boards alongside the upright stripping means and for raising the layer support means when the layer of boards is stripped therefrom.

References Cited

UNITED STATES PATENTS

| 1,490,594 | 4/1924 | Lateur. |
|-----------|--------|---------|
| 2,065,673 | 12/1936 | Fay. |
| 3,080,052 | 3/1963 | Hanbury. |
| 3,130,839 | 4/1964 | Grasvoll. |
| 3,257,006 | 6/1966 | Kampert. |
| 3,361,272 | 1/1968 | Carroll. |
| 3,393,812 | 7/1968 | Mayo et al. |

OTHER REFERENCES

German printed application 1,108,145, 5/31/1961.

GERALD M. FORLENZA, Primary Examiner

R. J. SPAR, Assistant Examiner

U.S. Cl. X.R.

214—8.5